United States Patent [19]

Kesler et al.

[11] Patent Number: 5,184,036
[45] Date of Patent: Feb. 2, 1993

[54] METHOD OF LIMITING OUTPUT CURRENT FROM AN INTERFACE DRIVE CIRCUIT

[75] Inventors: Scott B. Kesler; Mark W. Gose, both of Kokomo, Ind.

[73] Assignee: Delco Electronics Corporation, Kokomo, Ind.

[21] Appl. No.: 742,813

[22] Filed: Aug. 9, 1991

[51] Int. Cl.⁵ .................. H03K 5/08; H03L 5/00; H02H 3/08
[52] U.S. Cl. .................. 307/540; 307/350; 307/555; 307/564; 307/296.4; 361/79; 361/91; 361/101
[58] Field of Search ............... 307/540, 555, 557, 567, 307/362, 350, 558, 475, 564, 300, 296.4; 361/79, 91, 101, 104

[56] References Cited

U.S. PATENT DOCUMENTS

| | | | |
|---|---|---|---|
| 3,654,530 | 4/1972 | Lloyd | 307/567 |
| 3,676,713 | 7/1972 | Wiedmann | 307/300 |
| 3,988,643 | 10/1976 | Morris | 317/33 VR |
| 3,988,644 | 10/1976 | Krone | 317/33 R |
| 4,118,640 | 10/1978 | Ochi et al. | 307/304 |
| 4,258,277 | 3/1981 | Nutz | 307/567 |
| 4,333,120 | 6/1982 | Kotowski | 361/79 |
| 4,354,217 | 10/1982 | Mahon | 361/104 |
| 4,408,248 | 10/1983 | Bulley et al. | 361/91 |
| 4,533,845 | 8/1985 | Bynum et al. | 307/300 |
| 4,672,502 | 6/1987 | Reichart | 361/101 |
| 4,701,638 | 10/1987 | Marchio et al. | 307/557 |
| 4,750,079 | 6/1988 | Fay et al. | 361/101 |
| 4,860,154 | 8/1989 | Fazlollhai | 361/101 |

FOREIGN PATENT DOCUMENTS 0131854 10/1979 Japan .................. 307/567

Primary Examiner—John Zazworsky
Attorney, Agent, or Firm—Anthony Luke Simon

[57] ABSTRACT

A circuit limits the output drive current from an interface drive circuit comprising drive transistors. The circuit makes dual use of an external series supply resistor as a current sensing element. The increased voltage drop across the external resistor due to excessive current draw through the drive transistors is coupled to a control transistor, which reduces base drive current to the drive transistors in response to the increased voltage drop.

4 Claims, 1 Drawing Sheet

METHOD OF LIMITING OUTPUT CURRENT FROM AN INTERFACE DRIVE CIRCUIT

This invention relates to IC interface drive circuits and more particularly to circuitry, using a minimum amount of silicon area, for limiting the output drive current of an interface drive.

BACKGROUND OF THE INVENTION

Integrated circuitry meant for interface with other types of circuitry, such as power transistors, etc., which may require various load requirements, requires output circuitry capable of interfacing with the various loads. An example situation occurs where the output current available from high side driver outputs is limited by the gain of the high side pass transistor(s). In order to guarantee a minimum specified output current, the circuit must be designed to operate under conditions of minimum gain. However, when a high gain transistor is encountered, output current can become excessive, resulting in high levels of power dissipation, and possible IC damage. To prevent IC damage, a means of limiting the maximum amount of output current is necessary.

Traditional methods of limiting output current employ a current sensing element placed in series with the output current path. This element is typically a resistor across which a sense voltage is developed, or a diode that is part of a current mirror configuration. The current through the current sensing element creates a voltage drop that subtracts from the available output voltage of the circuit. In circuits with low supply voltages, unnecessary voltage drops are not desired. Additionally, each output current path requires a current sensing element and the associated circuitry, requiring additional silicon area and additional cost for circuits with more than one output current path.

It has also been found that circuitry for implementation of the current sensing elements tends to have substantial temperature coefficients, causing changes in the limited output current with changes in temperature. Temperature compensation circuitry to eliminate this trait requires even more silicon area and more cost. Additionally, if the current sensing element is an integrated resistor, silicon processing variations result in variations in the value of the resistor, leading to variations in values of the output current limit level.

SUMMARY OF THE PRESENT INVENTION

This invention provides circuitry for limiting the output current of interface drive circuitry without requiring a current sensing element in the output current path. Only one circuit of this invention is necessary for each integrated circuit, regardless of the number of output current paths, as long as no two paths are driven at the same time. Just one integrated diode is required for each additional output current path. If temperature compensation is desired, one temperature compensation circuit is implemented with the circuit of this invention for each integrated circuit. With the above features, this invention eliminates any unnecessary voltage drop at the output line, drastically reduces necessary silicon area and, therefore, fabrication costs, and eliminates some of the risks of processing variations.

This invention is for use with integrated circuits that use external series resistors in the supply voltage lines. Typical applications of an external resistors are as voltage drops for clamping supply voltage regulators and are common in automotive applications. This invention makes secondary use of the external resistors as output current sense elements. Since the external resistors are already required for other voltage clamping, their use as sense elements represents an effective savings in component count.

Sructurally, this invention comprises an external resistor coupled between an external means for supplying power and at least one output transistor. Additionally, there is internal means, including a transistor, coupled between the base drive of the output transistor and a clamped integrated circuit voltage supply line. The internal means limits the base drive current to the output transistor in response to the voltage drop across the external resistor, thereby using the external resistor as a sense resistor and limiting output current of the output transistor.

DETAILED DESCRIPTION OF THE DRAWINGS

Figure 1:
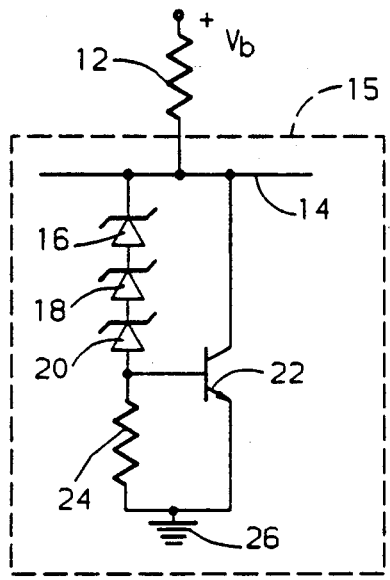
FIG. 1 is an illustration of a basic voltage supply clamp for an integrated circuit with which this invention may be implemented.

Referring to FIG. 1, the circuitry shown is a typical voltage clamp for an integrated circuit. The components within box 15 represent the integrated circuit components, resistor 12 is an external resistor which limits current to the integrated circuit and $v_b$ represents an external voltage source, such as a vehicle voltage supply. The circuitry shown is an ideal example of circuitry with which this invention may be implemented because of the use of external resistor 12.

In the circuit, the voltage difference between internal voltage supply line 14 and ground 26 equals the sum of the zener voltages of zener diodes 16, 18, and 20 plus the base to emitter voltage ($V_{be22}$) of transistor 22. Resistor 24 completes the current path between zener diode 20 and ground.

Figure 2:
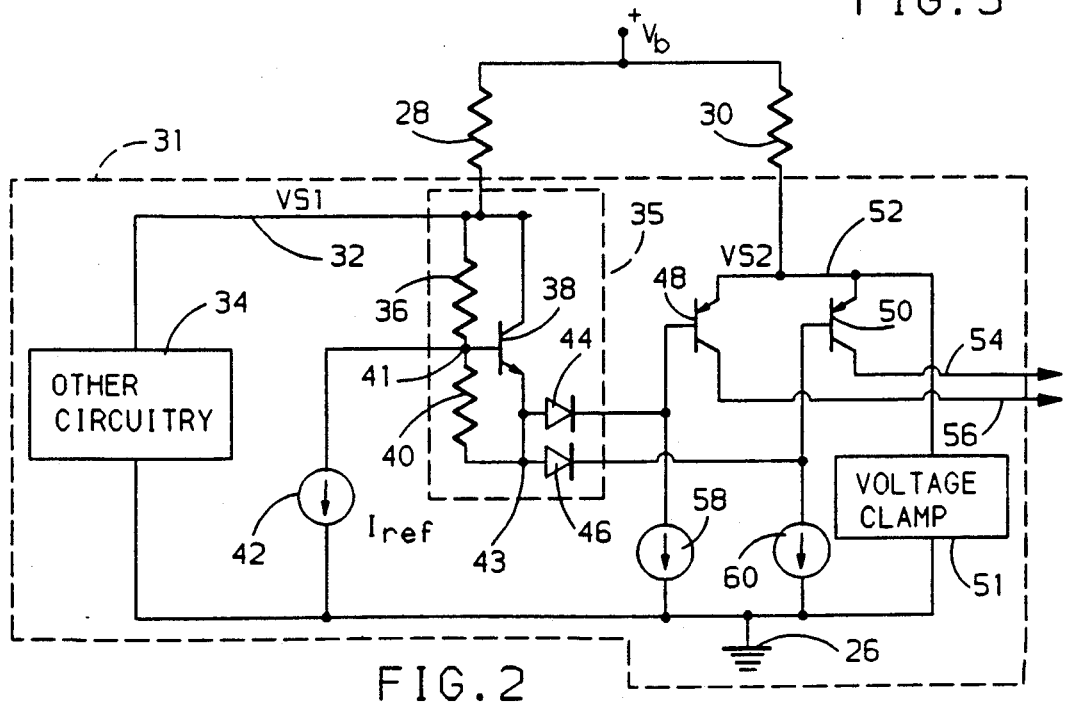
FIG. 2 is an illustration of one implementation of the circuit of this invention.

Referring to FIG. 2, the circuitry within box 31 represents integrated circuitry that receives power, through resistors 28 and 30, from an external power supply with voltage $V_b$. Lines 32 and 52 represent internal supply lines, each connected to a separate voltage clamp such as the clamped power supply shown in FIG. 1.

Box 34 generally represents other circuitry contained in IC 31 and may include the voltage clamp for line 32. Box 51 represents the voltage clamp for line 52. Transistors 48 and 50 are the output drive transistors and are connected to internal supply line 52. Base drives 58 and 60 selectively drive transistors 48 and 50 by selectively drawing current through the bases of transistors 48 and 50 in accordance with the desired circuit implementations. Those skilled in the art can easily implement suitable base drive circuitry (58 and 60) without further elaboration herein. As output drive transistors 48 and 50 are selectively driven, lines 54 and 56 provide output current to any suitable load, such as a power or switching transistor. As the current drawn through lines 54 or 56 increases, the current through resistor 30 increases, increasing the voltage drop across resistor 30.

The circuitry within box 35 generally pertains to the apparatus of this invention. The control transistor 38 as shown is an NPN transistor with its collector connected to internal supply line 32 and is emitter coupled through diodes 44 and 46 to the bases of output drive transistors 48 and 50. Resistor 36 is coupled between the collector and base of transistor 38 and resistor 40 is coupled between the base and emitter of transistor 38.

In the example shown, two output drive transistors are used. This invention covers the case in which one or many output drive transistors are used, as long as no two drive transistors are operated at the same time. If only one output drive transistor is used, the diode (44 or 46) may be omitted. If more than two output drive transistors are used, isolation diodes, similar to diodes 44 and 46, are coupled between the emitter of transistor 38 and the bases of the additional output drive transistors.

In operation, the output current limiting is achieved by sensing the voltage difference between the two supply voltages at lines 32 and 52, referred to as VS1 and VS2 respectively, due to variations in current drawn through resistor 30, and therefore variations in voltage across resistor 30. In implementations like the one shown, the current drawn from supply line 52 is the sum of the output current and the base drive current for the output drive transistors 48 and 50. Since the base drive current is known, the output current can be measured as any additional voltage drop in VS2 relative to $V_b$. Line 32 supplies current to the current limit circuitry as well as all other operational current for the IC 31. Given that the current draw from line 32 is known and relatively predictable, the voltage drop at VS1 relative to $V_b$ is also known and predictable.

Limitation of the output current is controlled by reducing the base drive to the output drive transistors when the voltage VS2 reaches a predetermined level below the voltage VS1. The predetermined voltage difference, referred to as $V_{lim}$, is defined by the sum of the base to emitter voltage ($V_{be}$) of transistor 38 and the voltage drop across resistor 36 ($R_1$), assuming for simplicity of discussion, that the voltages across diodes 44 and 46 are equal to the $V_{be}$ voltage of the output drive transistors 48 and 50. The approximation for the predetermined voltage difference then occurs when the voltage at node 43, $V_{43}$, is approximately equal to VS2. The difference between VS1 and VS2 then is equal to the collector to emitter voltage of transistor 38, which, as described above, is the sum of $V_{be}$ of transistor 38 and the voltage across resistor 36.

When the voltage at VS2 approaches $V_{43}$, transistor 38 begins to conduct current. Another explanation is that when the voltage difference between VS1 and VS2 equals $V_{lim}$, transistor 38 begins to draw current. The current flowing through transistor 38 is added to the current at the base of the output drive transistor being utilized (48 or 50). With the current through transistor 38 added to the base of the output drive transistor (48 or 50), the effective base drive current to that output drive transistor is reduced, limiting the output current on lines 54 or 56.

Resistors 36 ($R_1$) and 40 ($R_2$) together with transistor 38 comprise a standard $V_{be}$ multiplier circuit. Ignoring $I_{ref}$, established by current source 42, the $V_{lim}$ value set by transistor 38 is:

$$V_{lim} = V_{be}(1 + R_1/R_2). \quad (1)$$

Equation (1) shows that by varying the ratio of resistors 36 and 40, $V_{lim}$ can be varied to equal any value greater than $V_{be}$ of transistor 38. This flexibility of the fixation of $V_{lim}$ by transistor 38 allows a system designer to set up the desired VS1 to VS2 differential voltage at which the output current in lines 54 or 56 is to be limited.

The preferable implementation of this invention is to use temperature compensating current source 42. Current source 42 is desired because the voltage $V_{be}$ of transistor 38 has a large negative temperature coefficient. As the temperature of the IC changes, the differential VS1-VS2 changes, thereby tending to alter the output current limit level. Current source 42 prevents the output current limit level from being altered by controlling the temperature coefficient of $V_{lim}$ so that it matches the temperature coefficient of the external resistors 30 and 28.

A constant desired differential VS1-VS2 where the output current limit is maintained over a wide temperature range is achieved by adding an additional voltage drop with a positive temperature coefficient across resistor 36. The additional voltage drop is achieved using current source 42, which supplies current $I_{ref}$ having a positive temperature coefficient. $I_{ref}$ is used to pull current from line 32 through resistor 36. As the temperature of the IC increases, the $V_{be}$ of transistor 38 decreases, but the voltage drop on resistor 36 due to $I_{ref}$ increases. If set up in the proper ratio as described below, so that the temperature coefficients of $I_{ref}$ and $V_{be}$ counterbalance the temperature coefficients of the external resistors 28 and 30, the changes due to temperature offset each other, resulting in a constant output current limit level. With the preferred temperature compensating current source 42 in the circuit, the equation for $V_{lim}$ is:

$$V_{lim} = V_{be}(1 + R_1/R_2) + I_{ref} R_1. \quad (2)$$

Figure 3:
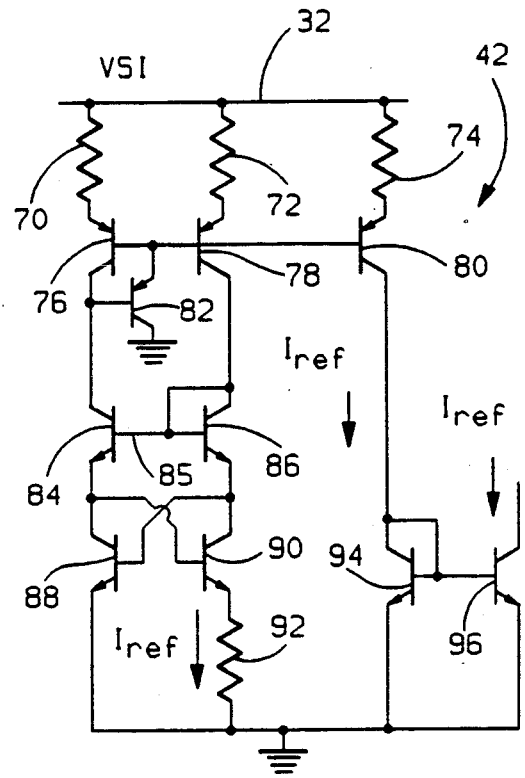
FIG. 3 is a circuit diagram of a temperature compensating current supply.

The preferred implementation for current source 42 is shown in FIG. 3 and is a standard "delta $V_{be}$" current generator. The current generated is controlled by transistors 84, 86, 88 and 90 and resistor 92. In the implementation shown, transistors 84 and 90 each have three times the emitter area of transistors 86 and 88, which are identical. Because of the larger emitter areas of transistors 84 and 90, the $V_{be}$ voltage drop of those transistors is smaller than the $V_{be}$ voltage drop of transistors 86 and 88. Using node 85 as a reference, the sum of the $V_{be}$ voltage of transistor 84 with the $V_{be}$ voltage of transistor 90 and the voltage drop across resistor 92 ($R_3$) is equal to the sum of the $V_{be}$ voltage drop of transistor 86 and the $V_{be}$ voltage drop of transistor 88.

From the above, it can be shown that the temperature dependent current $I_{ref}$ through resistor $R_3$ can be defined as:

$$I_{ref} = (V_t \ln(9))/R_3, \quad (3)$$

where $V_t$ is the thermal voltage defined by kT/q, where k is the Boltzman's constant, T is the temperature in degrees Kelvin, and q is the electronic charge. If the circuitry is implemented in a manner in which $V_t$ increases with temperature more rapidly than the value of resistor 92 ($R_3$), then $I_{ref}$ has a positive temperature coefficient.

With resistors 70, 72 and 74 having identical values, and transistors 76, 78, and 80 also being identical, the circuitry shown mirrors current $I_{ref}$ through transistor 94. Transistors 94 and 96 are in turn set up in a current mirror circuit such that transistor 96 draws the current $I_{ref}$ from node 41 (FIG. 2).

Since line 32 provides the voltage supply for other circuitry 34 (FIG. 2) as well as the output current limit circuit of this invention, the current drawn by the other circuitry must be taken into account when calculating the voltage drop across resistor 28 and when calculating the appropriate value for $V_{lim}$.

The proper $V_{lim}$ is set up by determining the voltage VS2 that occurs at line 52 when the output is at the desired current limit level, and subtracting this voltage from the known VS1 voltage that occurs on line 32 during the same condition. The mathematical expression is:

$$V_{lim} = R_{30} I_{max}(1 + \beta_{48}) - I_{28} R_{28}, \quad (4)$$

where $V_{lim}$ is the $V_{ce}$ voltage of transistor 38 at the current limit, $R_{30}$ is the value of resistor 30, $I_{max}$ is the output current level at which it is desired to limit the output current, $\beta_{48}$ is the $\beta$ value for transistor 48, transistor 50 or any other output transistor, $I_{28}$ is the current drawn through resistor 28 and $R_{28}$ is the value of resistor 28. The above equation also assumes that the $V_{be}$ of output transistors 48 and 50 equals the forward diode voltage of isolation diodes 44 and 46.

To achieve output current limit temperature independence, the temperature coefficients of the circuitry in box 35, the other circuitry 34 and current source 42 must sum to zero:

$$(dV_{be}dT)(1 + R_1/R_2) + ln(9)(dV_t/dT)(R_1/R_3) = dVS1i / dT,$$

provided resistors 28 and 30 have negligible temperature dependence. In the event that the temperature dependence of external resistors 28 and 30 cannot be ignored, the temperature coefficients of the circuitries 34 and 35 and the current source 42 must sum to the temperature coefficients of the external resistors 28 and 30. One skilled in the art can easily determine the temperature coefficients for $V_{be}$, $V_t$, VS1, resistor 28 and resistor 30 through experimental measurements.

Once the the temperature coefficients in the above equation are determined, the above equation is solved for $R_2$. The solution for $R_2$ then substituted into equation (2). Equation (2) and equation (4) above can then be used to determine the proper value for $R_1$. Once $R_1$ is solved for, $R_2$ can easily be determined. The resulting values for $R_1$ and $R_2$ satisfy the requirements of a substantially zero temperature coefficient for the system and proper current limiting of the output transistors 48 and 50.

With the circuit of this invention as described above, current through output transistors 48 and 50 is limited, protecting the IC and other components of an electrical system in which the IC is implemented from damage due to excessive current.

The above current generator is just one current generator which may be used with this invention. Any current generator that has a positive temperature coefficient can be used to supply current $I_{ref}$. Circuits with more linear temperature coefficients are preferred.

The above described implementations are just examples of this invention and are not limiting on its scope. Moreover various improvements and modifications to this invention may occur to those skilled in the art and will fall within the scope of this invention as defined below.

The embodiments of the invention in which an exclusive property or privilege is claimed are defined as follows:

1. A circuit comprising:
a source of electric power;
an external resistor; and
an integrated circuit comprising
    (a) a first voltage supply line having a first voltage level, VS1, coupled to the source of electric power,
    (b) a second voltage supply line having a second voltage level, VS2, coupled to the source of electric power by the external resistor, the second voltage level, VS2, varying in response to a resistor current flowing through the external resistor,
    (c) an integrated circuit common ground,
    (d) a drive transistor connected to the second voltage supply line and receiving power therefrom, the drive transistor having an output current controlled by a base drive current supplied to a base of the drive transistor,
    (e) a control circuit coupled between the first voltage supply line and the integrated circuit ground, and
    (f) means within the control circuit for limiting the base drive current in response to a variation in the resistor current and resulting variation in the second voltage level VS2, said means limiting the base drive current by reducing the base drive current when VS1 - VS2 is equal to a predetermined value, $V_{lim}$, wherein
the control circuit comprises a control transistor having a collector connected to the first voltage supply line, an emitter coupled to the base of the drive transistor and a control transistor base coupled to a current source, the control transistor operable to reduce the base drive current when VS1 - VS2 equals $V_{lim}$.

2. The apparatus set forth in claim 10, wherein the control transistor has a negative temperature coefficient and the current source has a positive temperature coefficient.

3. The apparatus set forth in claim 1, also comprising a first biasing resistor connected between the control transistor base and the collector of the control transistor and a second biasing resistor connected between the control transistor base and the emitter of the control transistor.

4. A circuit comprising:
a source of electric power;
an external resistor; and
an integrated circuit comprising
    (a) a first voltage supply line having a first voltage level, VS1, coupled to the source of electric power,
    (b) a second voltage supply line having a second voltage level, VS2, coupled to the source of electric power by the external resistor, the second voltage level, VS2, varying in response to a resistor current flowing through the external resistor,
    (c) an integrated circuit common ground,
    (d) a drive transistor connected to the second voltage supply line and receiving power therefrom, the drive transistor having an output current controlled by a base drive current supplied to a base of the drive transistor,
    (e) a control circuit coupled between the first voltage supply line and the integrated circuit ground,
    (f) means within the control circuit for limiting the base drive current in response to a variation in the resistor current and resulting variation in the second voltage level VS2, said means limiting the base drive current by reducing the base drive current when VS1-VS2 is equal to a predetermined value, $V_{lim}$;

(g) additional drive transistors; and
(h) a set of isolation diodes coupling the control circuit to the drive transistors, one isolation diode for each drive transistor.

* * * * *